US011651076B2

(12) United States Patent
Weizman et al.

(10) Patent No.: US 11,651,076 B2
(45) Date of Patent: May 16, 2023

(54) DETECTING SPREAD OF MALWARE THROUGH SHARED DATA STORAGES

(71) Applicant: Microsoft Technology Licensing, LLC, Redmond, WA (US)

(72) Inventors: Josef Weizman, Haifa (IL); Ram Haim Pliskin, Rishon Lezion (IL); Andrey Karpovsky, Kiryat Motzkin (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 17/331,380

(22) Filed: May 26, 2021

(65) Prior Publication Data

US 2022/0382863 A1 Dec. 1, 2022

(51) Int. Cl.
*G06F 21/00* (2013.01)
*G06F 21/56* (2013.01)
*G06F 21/78* (2013.01)
*G06F 21/55* (2013.01)

(52) U.S. Cl.
CPC .......... *G06F 21/566* (2013.01); *G06F 21/554* (2013.01); *G06F 21/564* (2013.01); *G06F 21/568* (2013.01); *G06F 21/78* (2013.01)

(58) Field of Classification Search
CPC ...... G06F 21/78; G06F 21/568; G06F 21/564; G06F 21/554; G06F 21/566
USPC ........................................................ 726/22
See application file for complete search history.

(56) References Cited

U.S. PATENT DOCUMENTS

| 8,074,281 | B2 * | 12/2011 | Peinado | G06F 21/565 |
| | | | | 713/188 |
| 2006/0070130 | A1 * | 3/2006 | Costea | H04L 63/1416 |
| | | | | 726/24 |
| 2007/0006304 | A1 * | 1/2007 | Kramer | G06F 21/55 |
| | | | | 726/22 |
| 2009/0183261 | A1 * | 7/2009 | Peinado | G06F 21/565 |
| | | | | 726/26 |
| 2013/0094619 | A1 * | 4/2013 | Shellhammer | H04L 27/2647 |
| | | | | 375/343 |
| 2018/0307780 | A1 * | 10/2018 | Keenan | G06F 3/0485 |
| 2021/0092147 | A1 * | 3/2021 | Hittel | G06F 16/176 |

FOREIGN PATENT DOCUMENTS

WO  WO-2016072310 A1 *  5/2016  ........... G06F 21/552

\* cited by examiner

*Primary Examiner* — Josnel Jeudy
(74) *Attorney, Agent, or Firm* — Mannava & Kang, P.C.

(57) ABSTRACT

According to examples, an apparatus may include machine-readable instructions that may cause the processor to determine that a first malware was detected on a first computing device and to determine whether a second malware was detected on a second computing device within a predefined period of time of when the first malware was detected on the first computing device, in which the first computing device and the second computing device are associated with a shared data storage that is remote from the first and second computing devices. The instructions may also cause the processor to, based on a determination that the second malware was detected within the predefined period of time, output a notification that the first malware was likely spread to the first computing device and/or that the second malware was likely spread to the second computing device through the shared data storage.

20 Claims, 5 Drawing Sheets

DETECTING SPREAD OF MALWARE THROUGH SHARED DATA STORAGES

BACKGROUND

Computing devices may be victims of malware attacks. Anti-malware solutions may match a signature of malicious code or files against evaluated software to determine that the software may be malware and thus may be harmful to a computing device. Malware may include, but is not limited to, viruses, sources of denial-of-service-attacks, sources of phishing attacks, spyware, password stealers, loggers, Trojans, and/or adware.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable media in which a processor may determine whether a shared data storage likely spread malware to computing devices with which the shared data storage may communicate. The shared data storage may be a cloud-based data storage that multiple computing devices may access to store and/or modify data, execute applications, access services, and/or the like. The processor may be a processor of a server that may access information pertaining to the shared data storage, which may include multiple data storage devices, e.g., memories, hard disks, solid state drives, and/or the like. In this regard, the processor may be a processor of a server that an administrator, IT personnel, security personnel, and/or the like, of a cloud service provider of which the shared data storage may be included may access.

In determining whether the shared data storage likely spread malware, the processor may determine whether a first malware was detected on a first computing device and a second malware was detected on a second computing device. The processor may also determine whether the first malware and the second malware were detected within a predefined period of time with respect to each other. In some examples, the processor may determine that the shared data storage likely spread the first and/or second malware based on the determination that the first malware and the second malware were detected within the predefined period of time. Likewise, the processor may determine that the shared data storage likely did not spread the first and/or second malware based on the determination that the first malware and the second malware were not detected within the predefined period of time.

In some examples, each of the computing devices that may have access to the shared data storage may be members of a common tenant, while in other examples, some or all of the computing devices may be members of multiple tenants. Thus, in one regard, the processor may determine that the shared data storage may have likely spread malware even in instances in which the computing devices are members of different tenants.

As the processor may be a processor in a server of a cloud services provider, the processor may have access to various types of information to which the owners or operators of the computing devices may not have access. This information may include, for instance, information collected by application program interfaces (APIs) of the cloud services provider, information pertaining to interactions that the shared data storage may have with computing devices across multiple tenants, and/or the like. The information pertaining to the interactions may include the types of interactions, the dates and/or times of the interactions, the frequencies of the interactions, identities of the computing devices with which the interactions occurred, and/or the like. The processor may output notifications regarding the likelihood that the shared data storage spread malware, indications of which computing devices and/or shared data storages may likely have spread malware, and/or the like. The outputted information may be used to prevent the further spread of the malware and/or identification and removal of the malware from infected computing devices.

In many networked environments, malware may be spread through shared data storages without it being known that the shared data storages may have spread the malware. This may occur because computing devices that may be members of various tenants may access the shared data storages and thus, administrators of the tenants may not have visibility to malware alerts issued by computing devices in the various tenants. As a result, the shared data storages may continue to spread the malware to other computing devices in the same or different tenants. Through implementation of the features of the present disclosure, determinations as to whether shared data storages may have spread malware may be made regardless of whether the shared data storages are shared among computing devices that are members of multiple tenants. As a result, anti-malware solutions may be employed on the shared data storages to remove the malware from the shared data storage. In addition, or alternatively, communications between the shared data storage and the computing devices may temporarily be halted to prevent the spread of the malware. A technical improvement afforded through implementation of various features of the present disclosure may be that the spread of malware may be reduced and/or prevented, which may improve security on the computing devices that may access the shared data storages.

Figure 1:
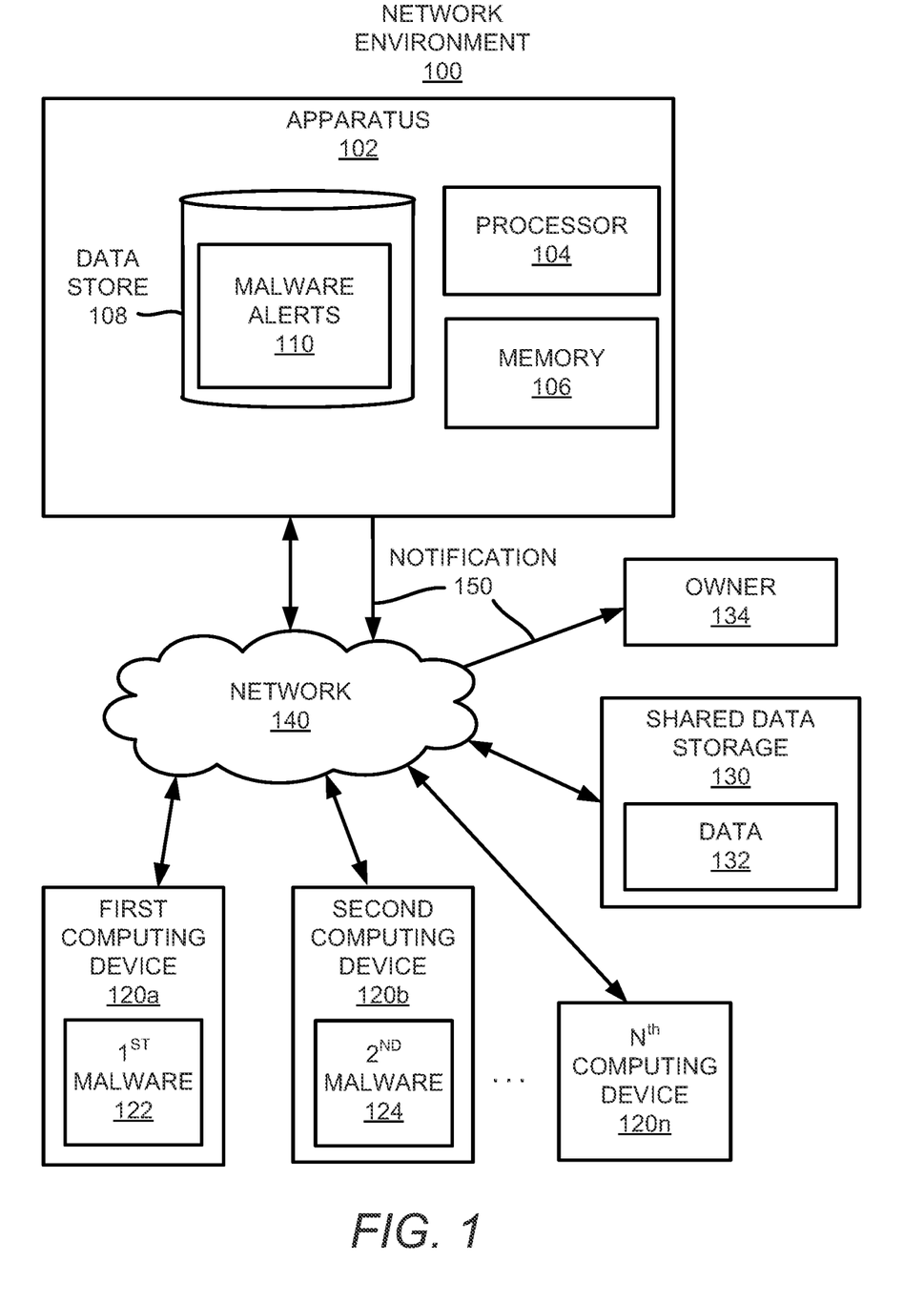
FIG. 1 shows a block diagram of a network environment, in which an apparatus may determine whether a malware was likely spread through a shared data storage and may output a notification regarding the likely spread of the malware, in accordance with an embodiment of the present disclosure.
Figure 2:
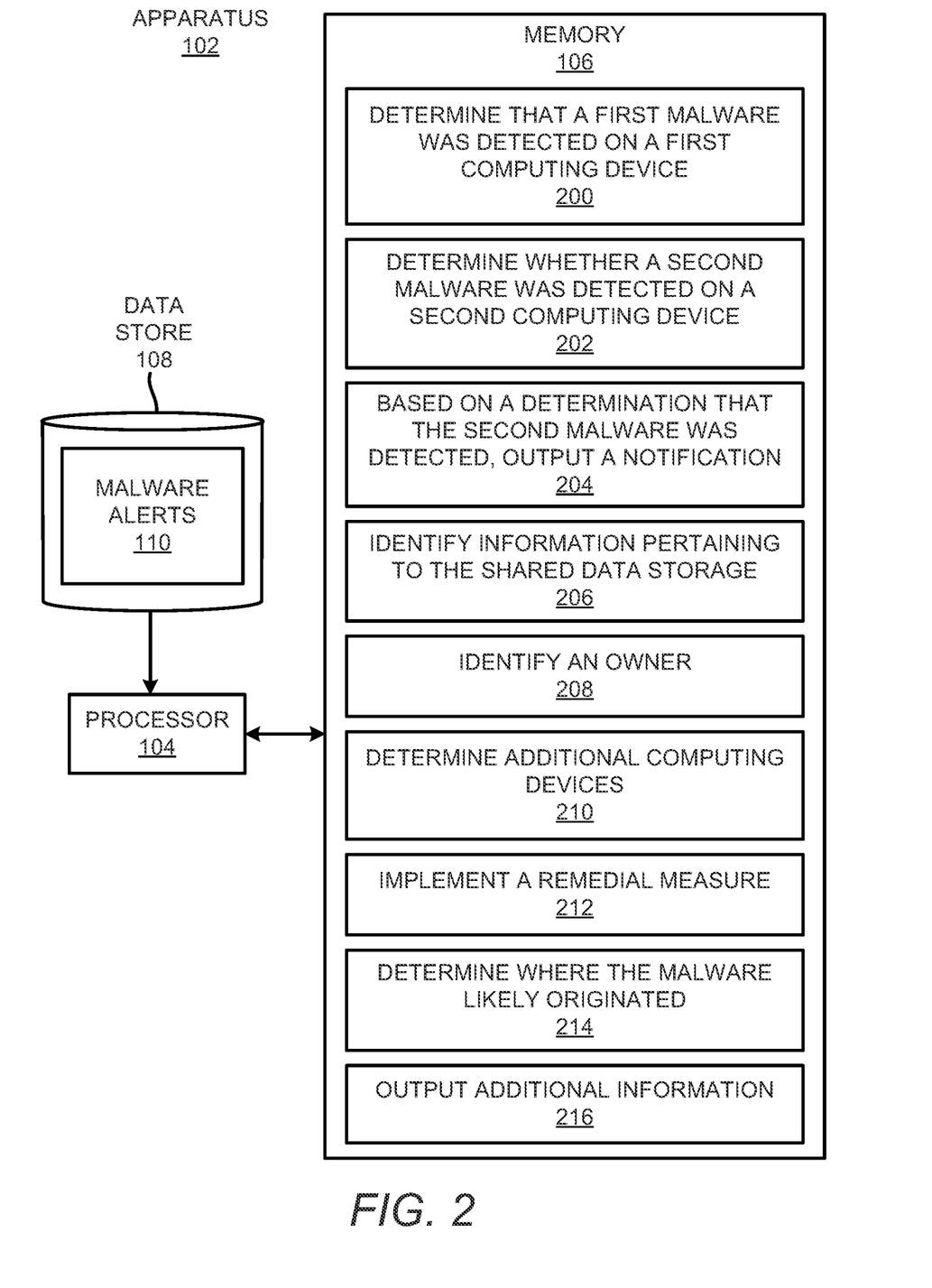
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may determine whether a malware was likely spread through a shared data storage and may output a notification regarding the likely spread of the malware, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatuses 102 may include additional features and that some of the features described herein may be removed and/or modified without departing from the scopes of the network environment 100 and/or the apparatuses 102.

As shown in FIG. 1, the network environment 100 may include the apparatus 102 and a plurality of computing devices 120a-120n, in which the variable "n" may represent a value greater than one. The apparatus 102 may be a computing device, such as a server, a desktop computer, a laptop computer, and/or the like. The computing devices 120a-120n may each be any of a laptop computing device, a desktop computing device, a tablet computer, a smartphone, and/or the like. The computing devices 120a-120n may communicate with a shared data storage 130 on which data 132 may be stored, in which the shared data storage 130 may be remote from the computing devices 120a-120n. In some examples, the apparatus 102 may be a computing device that an administrator, IT personnel, and/or the like, may access in, for instance, managing access to and operations of the shared data storage 130. By way of particular example, the apparatus 102 may be a server of a cloud data storage services provider.

The computing devices 120a-120n may communicate with the shared data storage 130 by accessing, modifying, uploading, deleting, etc., the data 132 on the shared data storage 130. As shown hi FIG. 1, the computing devices 120a-120n may communicate with the shared data storage 130 via a network 140, which may be a local area network, a wide area network, the Internet, and/or the like. For instance, the shared data storage 130 may be one or more servers, one or more data storage devices, and/or the like, that the computing devices 120a-120n may access via a cloud-based network. In some examples, the shared data storage 130 may be assigned to a particular storage account and each of the computing devices 120a-120n may have access to the particular storage account. In addition, an owner 134 may own (or, equivalently, be assigned to) the particular storage account and may have certain rights to the particular storage account.

According to examples, the computing devices 120a-120n may access the shared data storage 130 through use of credentials assigned to an organization. In some examples, the computing devices 120a-120n may be members of a common tenant of a cloud-based data storage provider that may provide the shared data storage 130. In other examples, some of the computing devices 120a-120n may access the shared data storage 130 through use of multiple different credentials assigned to multiple organizations, e.g., multiple accounts with the cloud-based data storage provider. In these examples, the some of the computing devices 120a-120n may be members of multiple tenants of the cloud-based data storage provider.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-216 that the processor 104 may execute. Although the instructions 200-216 are described herein as being stored on the memory 106 and may thus include a set of machine-readable instructions, the apparatus 102 may include hardware logic blocks that may perform functions similar to the instructions 200-216. For instance, the processor 104 may include hardware components that may execute the instructions 200-216. In other examples, the apparatus 102 may include a combination of instructions and hardware logic blocks to implement or execute functions corresponding to the instructions 200-216. In any of these examples, the processor 104 may implement the hardware logic blocks and/or execute the instructions 200-216. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to determine that a first malware 122 was detected on a first computing device 120a. The processor 104 may determine that the first malware 122 was detected on the first computing device 120a based on receipt of an alert from the first computing device 120a. The first malware 122 may be detected on the first computing device 120a in any of a number of various manners. For instance, a processor of the first computing device 120a may execute an anti-malware application that may detect the first malware 122. In addition, the processor of the first computing device 120a may execute an instruction that may cause a notification that includes an indication that the first malware 122 was detected on the first computing device 120a to be outputted to the apparatus 102. The notification may also include an indication of the name, type, and/or the like of the first malware 122. The first malware 122 may be a virus, a denial-of-service-attack, a phishing attack, spyware, a password stealer, a data logger, a Trojan, adware, and/or the like.

The processor 104 may execute the instructions 202 to determine whether a second malware 124 was detected on a second computing device 120b within a predefined period of time of when the first malware 122 was detected on the first computing device 120a. In some examples, the processor 104 may determine whether the second malware 124 was detected on the second computing device 120b within the predefined period of time of when the first malware 122 was detected on the first computing device 120a based on the determination that the first malware 122 was detected on the first computing device 120a.

As discussed herein, the first computing device 120a and the second computing device 120b may be associated with a shared data storage 130 that is remote from the first and second computing devices 120a, 120b. In other words, both the first computing device 120a and the second computing device 120b may access the shared data storage 130 through remote connections. In some instances, the first computing device 120a and the second computing device 120b may be members of a common tenant and may thus access common sets of data 132. In other instances, the first computing device 120a and the second computing device 120b may be members of disparate tenants. In these instances, the first computing device 120a and the second computing device 120b may not access common sets of data 132, but instead, may access respective sets of data 132 on the shared data storage 130.

The predefined period of time may be an hour, a day, a week, and/or the like. The predefined period of time may also be user defined, for instance, by an administrator, an IT personnel, and/or the like of the apparatus 102.

The processor 104 may execute the instructions 204 to, based on a determination that the second malware 124 was detected on the second computing device 120b within the predefined period of time, output a notification 150 that the first malware 122 was likely spread to the first computing device 120a and/or that the second malware 124 was likely spread to the second computing device 120b through the shared data storage 130. The second malware 124 may be a virus, a denial-of-service-attack, a phishing attack, spyware, a password stealer, a data logger, a Trojan, adware, and/or the like. In addition, the second malware 124 may be the same malware as the first malware 122 or may be a different malware from the first malware 122. The processor 104 may also determine that the first malware 122 may likely have originated hi the first computing device 120a, the second computing device 120b, or the shared data storage 130, and that the first malware 122 was likely spread through the shared data storage 130. In other words, the processor 104 may determine that the shared data storage 130 is likely infected with a malware 122, 124.

The processor 104 may determine that the second malware 124 was detected on the second computing device 120b based on receipt of an alert from the second computing device 120b. The second malware 124 may be detected on the second computing device 120a in any of a number of various manners. For instance, a processor (not shown) of the second computing device 120a may execute an anti-malware application that may detect the second malware 124 on the second computing device 120a. In addition, the processor of the second computing device 120b may execute an instruction that may cause an alert that includes an indication that the second malware 124 was detected on the second computing device 120b to be outputted to the apparatus 102. The processor 104 may also determine whether the alert was received from the second computing device 120b within the predefined period of time and/or whether the alert indicates that the second malware 124 was detected within the predefined period of time.

The processor 104 may store the malware alerts 110 received from the first computing device 120a and the second computing device 120b in a data store 108. The data store 108 may be a Random Access memory (RAM), an Electrically Erasable Programmable Read-Only Memory (EEPROM), a storage device, or the like.

However, based on a determination that a second malware 124 was not detected on the second computing device 120b, the processor 104 may not output a notification 150. In other words, based on a determination that an alert regarding a second malware 124 was not received from the second computing device 120b, the processor 104 may determine that the first malware 122 was likely not communicated or otherwise did not spread through the shared data storage 130. The processor 104 may thus determine that the instance of the first malware 122 is likely an isolated event and that the first malware 122 is to be addressed locally on the first computing device 120a.

In some examples, the processor 104 may execute the instructions 206 to identify information pertaining to the shared data storage 130. The information pertaining to the shared data storage 130 may include, for instance, a storage account assigned to the shared data storage 130. The processor 104 may access a database or other data source to identify the information pertaining to the shared data storage 130. In addition, the processor 104 may execute the instructions 208 to identify an owner 134 of the storage account assigned to the shared data storage 130 from the identified information. The processor 104 may also output the notification 150 to the identified owner 134 of the storage account.

In some examples, the processor 104 may execute the instructions 210 to determine additional computing devices 120c-120n associated with the shared data storage 130. The processor 104 may determine the additional computing devices 120c-120n that have access to the shared data storage 130 from the identified information pertaining to the shared data storage 130. The additional computing devices 120c-120n may be computing devices 120c-120n that may be members of a common tenant as the first computing device 120a and/or the second computing device 120b. In addition, or alternatively, the additional computing devices 120c-120n may be computing devices 120c-120n that may be members of tenants other than the tenant to which the first computing device 120a and/or the second computing device 120b are members.

The processor 104 may execute the instructions 212 to implement a remedial measure to prevent the additional computing devices 120c-120n from being infected with the first malware 122 and/or the second malware 124. For instance, the processor 104 may block communications between the additional computing devices 120c-120n and the shared data storage 130. In addition, or alternatively, the processor 104 may output notifications to the additional computing devices 120c-120n that may include an indication that the additional computing devices 120c-120n may have been infected by malware. The additional computing devices 120c-120n may execute anti-malware applications responsive to receipt of the notifications. The anti-malware applications may attempt to remove any identified malware from the additional computing devices 120c-120n.

In some examples, the processor 104 may identify information pertaining to communications between the shared data storage 130 and computing devices 120a-120n. The processor 104 may identify the information pertaining to the communications based on information identified pertaining to the shared data storage 130. In some examples, the processor 104 may identify the information pertaining to the shared data storage 130 from application program interfaces (APIs) associated with access to and/or communications with the shared data storage 130. The information may include identities and/or IP addresses of the computing devices 120a-120n with which the shared data storage 130 communicated, the identity of the owner 134 of the shared data storage, whether the computing devices 120a-120n downloaded data from the shared data storage 130, whether the computing devices 120a-120n uploaded data to the shared data storage 130, dates and times at which the communications occurred, and/or the like.

By way of example, the processor 104 may identify cloud-based details corresponding to activities around infection of the first computing device 120a with the first malware 122 and infection of the second computing device 120b with the second malware 124. The cloud-based details may include details corresponding to activities by computing devices 120a-120b that are members of a common tenant. In addition, or alternatively, the cloud-based details may include details corresponding to multiple tenants having accounts to the shared data storage 130, hi which the multiple tenants may be members of multiple organizations.

The processor 104 may execute the instructions 214 to determine where the malware 122, 124 likely originated. That is, the processor 104 may determine whether the first and/or second malware 122, 124 likely originated from the first computing device 120a, the second computing device 120b, or the shared data storage 130 based on the identified information. For instance, the processor 104 may analyze the identified information to follow paths that the first malware 122 and/or the second malware 124 traversed among the computing devices 120a-120n and the shared data storage. Thus, the processor 104 may determine that the first malware 122 originated or otherwise spread through the shared data storage 130 based on the first malware 122 being on multiple ones of the computing devices 120a-120n that received data from the shared data storage 130 while those computing devices 120a-120n that did not receive data from the shared data storage 130 are not infected with the first malware 122.

The processor 104 may execute the instructions 216 to output additional information such as an indication as to whether the first and/or second malware 122, 124 likely originated from the first computing device 120a, the second computing device 120b, or the shared data storage 130. In addition, or alternatively, the processor 104 may output the identified cloud-based details. The cloud-based details may be analyzed, for instance, by an administrator, IT personnel, network security personnel, or the like, to determine where the first and/or second malware 122, 124 likely originated.

According to examples, the processor 104 may select a predefined window of time for analysis of an origination of a malware 122, 124. The predefined window of time may be within a range of hours, days, weeks, and/or the like and may be user-defined, such as by an administrator, an IT personnel, and/or the like. In these examples, the processor 104 may process alerts 110 received from the computing devices 120a-120n during predefined windows of time, e.g., as batches received during the predefined windows of time. For instance, the processor 104 may determine whether the first malware 122 and the second malware 124 were detected during a first window of time, whether the first malware 122 and the second malware 124 were detected during a second window of time, and so forth. In addition, the processor 104 may output the notification based on the first malware 122 and the second malware 124 being detected during the selected predefined window of time.

Figure 3:
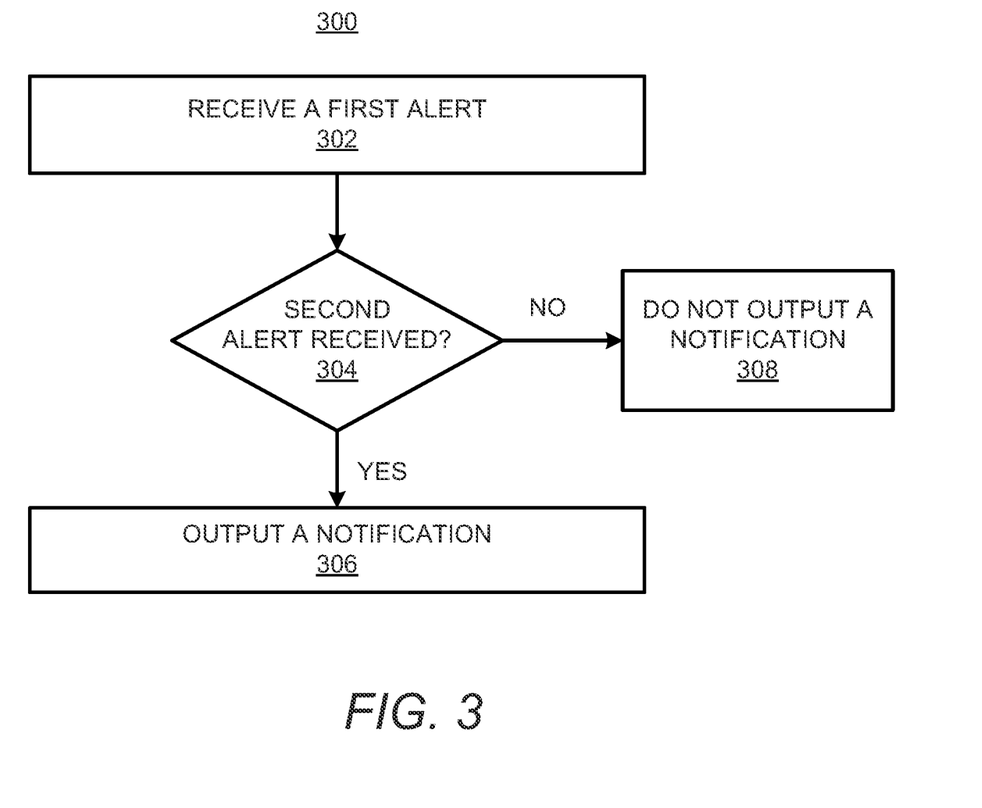
FIGS. 3 and 4, respectively, depict flow diagrams of methods for determining whether a shared data storage likely spread a first malware and/or a second malware, in accordance with an embodiment of the present disclosure.
Figure 4:
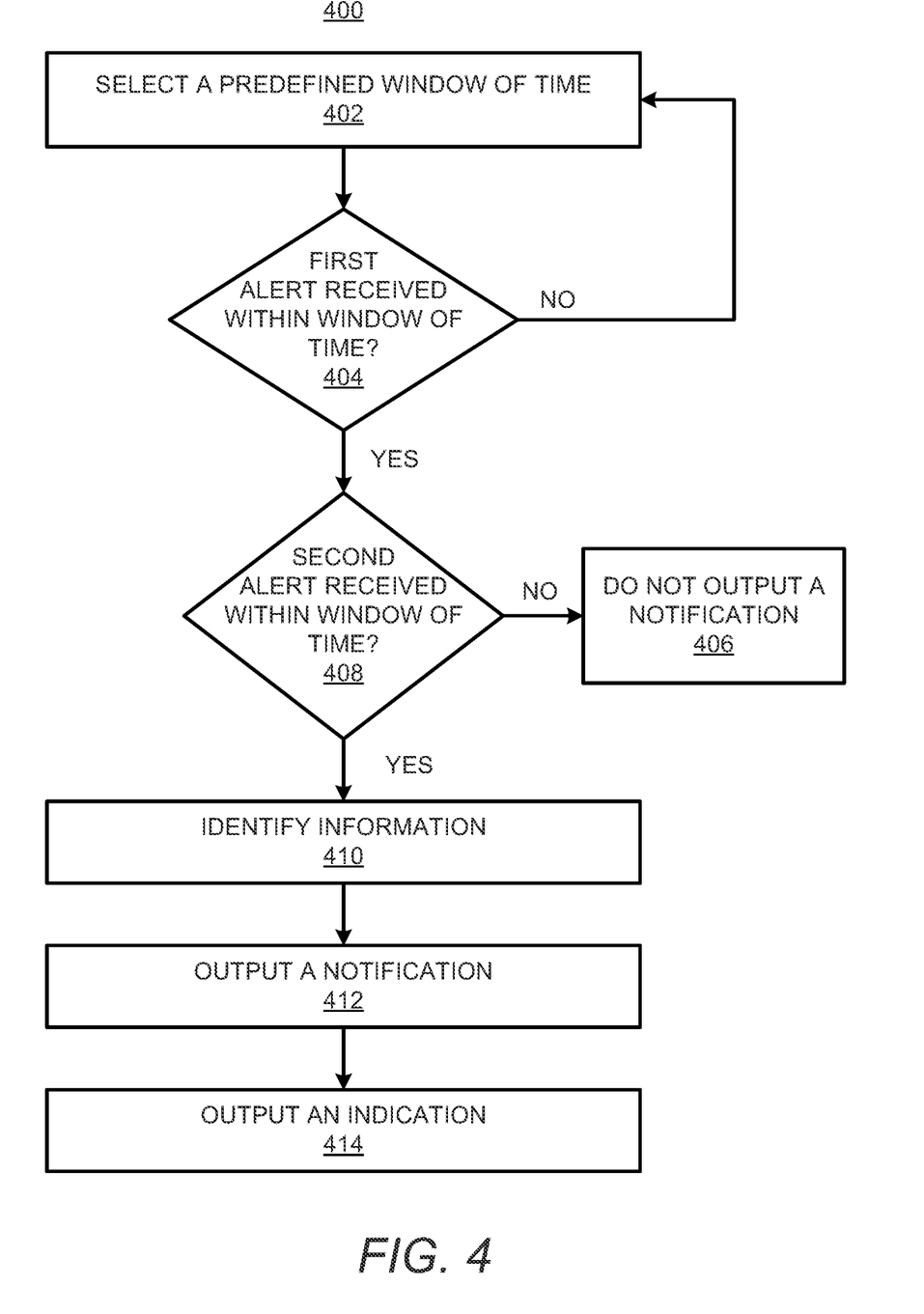

Various manners in which the processor 104 of the apparatus 102 may operate are discussed in greater detail with respect to the methods 300 and 400 depicted in FIGS. 3 and 4. Particularly, FIGS. 3 and 4, respectively, depict flow diagrams of methods 300, 400 for determining whether a shared data storage 130 likely spread a first malware 122 and/or a second malware 124, in accordance with an embodiment of the present disclosure. It should be understood that the methods 300 and 400 may include additional operations and that some of the operations described therein may be removed and/or modified without departing from the scopes of the methods 300 and 400. The descriptions of the methods 300 and 400 are made with reference to the features depicted in FIGS. 1 and 2 for purposes of illustration.

With reference first to FIG. 3, at block 302, the processor 104 may receive a first alert that a first malware 122 was detected on a first computing device 120a. The processor 104 may receive the first alert from the first computing device 120a.

At block 304, the processor 104 may determine whether a second alert that a second malware 124 was detected on a second computing device 120b has been received. The first computing device 120a and the second computing device 120b may be associated with a shared data storage 130 that is remote from the first and second computing devices 120a, 120b.

Based on a determination that the first alert and the second alert have been received, at block 306, the processor 104 may output a notification that the shared data storage 130 likely spread the first malware 122 and/or the second malware 124. As discussed herein, the second malware 124 may be the same as the first malware 122. However, based on a determination the second alert has not been received, at block 308, the processor 104 may not output the notification.

In some examples, the processor 104 may determine whether the second malware 124 was detected on the second computing device 120b within a predefined period of time of when the first malware 122 was detected on the first computing device 120a. In addition, the processor 104 may output the notification based on a determination that the second malware was detected within the predefined period of time.

With reference now to FIG. 4, at block 402, the processor 104 may select a predefined window of time. The selected predefined window of time may be a certain window of time among a plurality of windows of time. For instance, the processor 104 may select one of the plurality of windows of time, which may be a certain day, a certain range of days, a certain time period of a certain day, etc.

At block 404, the processor 104 may determine whether a first malware 122 was detected on the first computing device 120a during the selected predefined window of time.

The processor 104 may determine whether an alert indicating that any type of malware was detected on the first computing device 120a was received. Based on a determination that the first malware 122 was not detected on the first computing device 120a, e.g., that a malware was not detected on the first computing device 120a, the processor 104 may not output a notification 150. Instead, the processor 104 may select another predefined window of time at block 402 and may repeat blocks 402 and 404.

However, based on a determination that the first malware 122 was detected on the first computing device 120a, at block 408, the processor 104 may determine whether a second alert indicating that a second malware 124 was detected on a second computing device 120b was received. In other words, the processor 104 may determine whether the second malware 124 was detected on the second computing device 120b during the selected predefined window of time. Based on a determination that the second alert was not received, e.g., that a second malware 124 was not detected on the second computing device 120b within the selected predefined window of time, at block 406, the processor 104 may not output a notification regarding whether the shared data storage 130 likely spread a malware. Alternatively, the processor 104 may output a notification that the shared data storage 130 likely did not spread a malware.

Based on a determination that the second alert was received within the selected predefined window of time, at block 410, the processor 104 may identify information corresponding to the shared data storage 130, in which the shared data storage 130 may be assigned to a storage account. As discussed herein, the processor 104 may identify various types of information, such as cloud-based information, information obtained from APIs, information pertaining to communications between the shared data storage 130 and computing devices 120a-120n, and/or the like. In some examples, the processor 104 may identify an owner 134 of the storage account from the determined information and may, at block 412, output a notification to the identified owner 134 of the storage account that the shared data storage 130 may likely have spread the first malware 122 and/or the second malware 124.

According to examples, at block 412, the processor 104 may output, based on a determination as to whether the second malware 124 was detected on the second computing device 120b, an indication as to whether the first malware 122 and/or the second malware 124 likely originated from the first computing device 120a, the second computing device 120b, or the shared data storage 130. In addition, or alternatively, the processor 104 may identify cloud-based details corresponding to multiple tenants having accounts to the shared data storage 130, hi which the multiple tenants are members of multiple organizations. The processor 104 may also determine where the first malware 122 and/or the second malware 124 likely originated from the identified cloud-based details. In addition, at block 414, the processor 104 may output, based on the determination, an indication as to where the first malware 122 and/or the second malware 124 likely originated.

Some or all of the operations set forth in the methods 300, 400 may be included as utilities, programs, or subprograms, in any desired computer accessible medium. In addition, the methods 300, 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
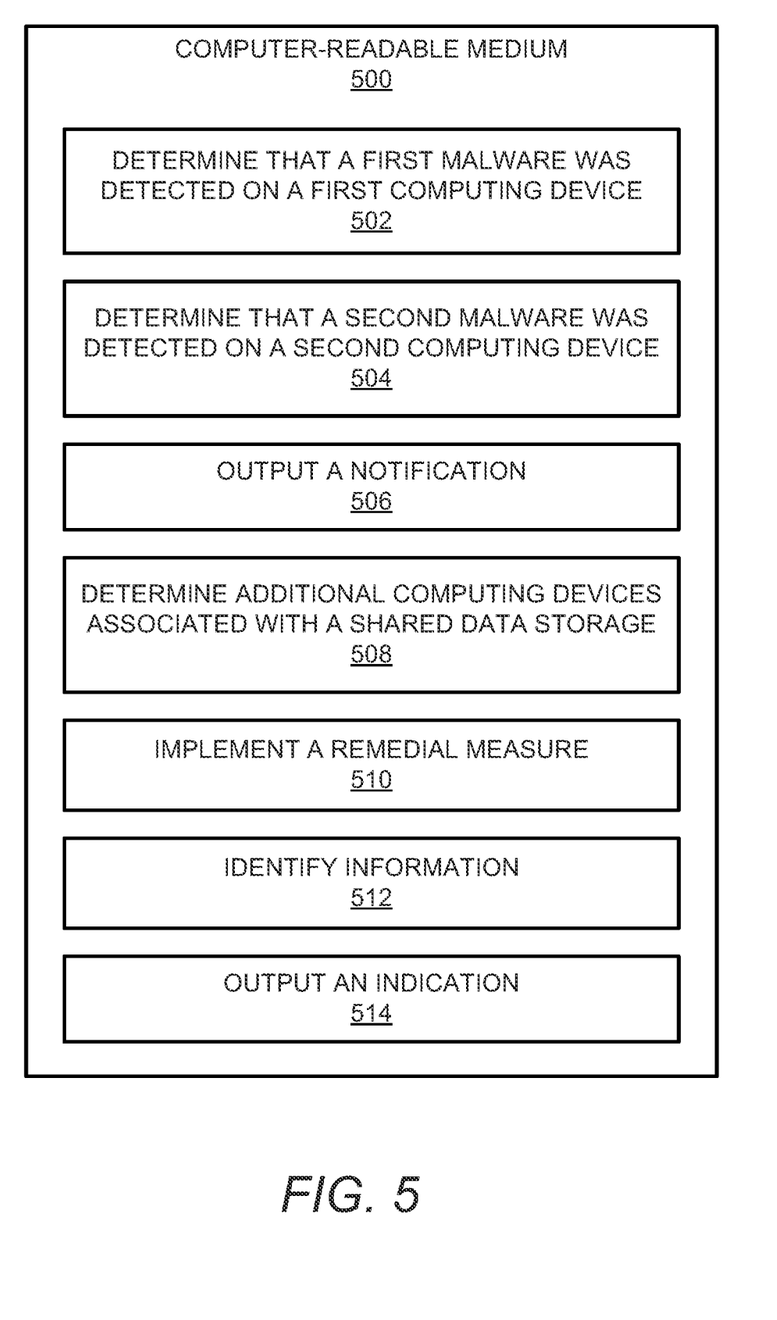
FIG. 5 shows a block diagram of a computer-readable medium that may have stored thereon computer-readable instructions for determining whether a shared data storage likely spread a first malware and/or a second malware and to output a notification based on a determination that the shared data storage likely spread the first malware and/or the second malware, in accordance with an embodiment of the present disclosure.

Turning now to FIG. 5, there is shown a block diagram of a computer-readable medium 500 that may have stored thereon computer-readable instructions for determining whether a shared data storage 130 likely spread a first malware 122 and/or a second malware 124 and to output a notification based on a determination that the shared data storage 130 likely spread the first malware 122 and/or the second malware 124, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-514 that a processor, such as a processor 104 of the apparatus 102 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to determine that a first malware 122 was detected on a first computing device 120a. The processor may fetch, decode, and execute the instructions 504 to determine that a second malware 124 was detected on a second computing device 120b, in which the first computing device 120a and the second computing device 120b are associated with a shared data storage 130 that is remote from the first and second computing devices 120a, 120b. The processor may fetch, decode, and execute the instructions 506 to, based on the determinations that the first malware 122 was detected on the first computing device 120a and that the second malware 124 was detected on the second computing device 120b, output a notification 150 that the first malware 122 and/or the second malware 124 was likely spread through the shared data storage 130.

In some examples, the processor may fetch, decode, and execute the instructions 508 to determine additional computing devices 120c-120n associated with the shared data storage 130. For instance, the processor may determine additional computing devices 120c-120n that may have access to the shared data storage 130, may have access to a storage account associated with the shared data storage 130, and/or the like. As the additional computing devices 120c-120n may access the data on the shared data storage 130, the shared data storage 130 may have spread the malware 122 and/or 124 to the additional computing devices 120c-120n. The processor may fetch, decode, and execute the instructions 512 to implement a remedial measure to prevent the additional computing devices 120c-120n from being infected with the first and/or second malware 122, 124. The remedial measure may include blocking access to the shared data storage 130, outputting notifications to the additional computing devices 120c-120n to run anti-malware programs, and/or the like.

According to examples, the processor may fetch, decode, and execute the instructions 512 to identify information pertaining to communications between the shared data storage 130 and computing devices 120a-120n. In these examples, the processor may determine whether the first and/or second malware 122, 124 likely originated from the first computing device 120a, the second computing device 120b, or the shared data storage 130 based on the identified information. In addition, the processor may fetch, decode, and execute the instructions 514 to output, based on the determination, an indication as to whether the first and/or second malware 122, 124 likely originated from the first computing device 120a, the second computing device 120b, or the shared data storage 130.

In some examples, the processor may identify cloud-based details corresponding to activities around infection of the first computing device 120a with the first malware 122 and infection of the second computing device 120b with the second malware 124. In addition, the processor may output the identified cloud-based details, in which the cloud-based details may be analyzed to determine where the first and/or second malware 122, 124 likely originated.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
   determine that a first malware was detected on a first computing device;
   determine whether a second malware was detected on a second computing device within a predefined period of time after the first malware was detected on the first computing device, wherein the first computing device and the second computing device accessed a same shared data storage; and
   based on a determination that the second malware was detected on the second computing device within the predefined period of time after the first malware was detected on the first computing device and that the first computing device and the second computing device accessed the same shared data storage, output a notification that the same shared data storage is to be checked to determine whether the same shared data storage spread the first malware and the second malware.

2. The apparatus of claim 1, wherein the instructions cause the processor to:
   identify information pertaining to the same shared data storage, wherein the same shared data storage is assigned to a storage account;
   identify an owner of the storage account from the identified information; and
   output the notification to the identified owner of the storage account.

3. The apparatus of claim 2, wherein the instructions cause the processor to:
   identify additional computing devices that have accessed the same shared data storage; and
   implement a remedial measure to prevent the additional computing devices from being infected with the first malware or the second malware.

4. The apparatus of claim 1, wherein the instructions cause the processor to:
   identify information pertaining to communications between the same shared data storage and the first and second computing devices;
   determine whether the first malware or the second malware originated from the first computing device, the second computing device, or the same shared data storage based on the identified information; and
   output, based on the determination, an indication as to whether the first malware or the second malware originated from the first computing device, the second computing device, or the same shared data storage.

5. The apparatus of claim 1, wherein the instructions cause the processor to:
   identify cloud-based details corresponding to activities related to the first computing device being infected with the first malware and the second computing device being infected with the second malware; and
   output the identified cloud-based details to determine where the first malware and the second malware originated.

6. The apparatus of claim 1, wherein the instructions cause the processor to:
   identify cloud-based details corresponding to multiple tenants having accounts to the same shared data storage, wherein the multiple tenants are members of multiple organizations;
   determine where the first malware and the second malware originated from the identified cloud-based details; and
   output an indication as to where the first malware and the second malware originated.

7. The apparatus of claim 1, wherein the instructions cause the processor to:
   receive a first alert from the first computing device, wherein the first alert includes an indication that the first malware was detected on the first computing device; and
   receive a second alert from the second computing device, wherein the second alert includes an indication that the second malware was detected on the second computing device.

8. The apparatus of claim 1, wherein the instructions cause the processor to:
   determine whether the second malware was detected on the second computing device within the predefined period of time after the first malware was detected on the first computing device based on the determination that the first malware was detected on the first computing device.

9. The apparatus of claim 1, wherein the predefined period of time is user-defined.

10. A method comprising:
    determining, by a processor, that a first malware was detected on a first computing device;
    determining, by the processor, whether a second malware was detected on a second computing device within a predefined period of time after the first malware was detected on the first computing device, wherein the first computing device and the second computing device accessed a same shared data storage; and based on a determination that the second malware was detected on the second computing device within the predefined period of time after the first malware was detected on the first computing device and a determination that the first computing device and the second computing device accessed the same shared data storage, outputting, by the processor, a notification that the same shared data storage is to be checked to determine whether the same shared data storage spread the first malware and the second malware.

11. The method of claim 10, further comprising:

identifying additional computing devices that have accessed the same shared data storage; and implementing a remedial measure to prevent the additional computing devices from being infected with the first malware and the second malware.

12. The method of claim 10, further comprising:

receiving a first alert from the first computing device, wherein the first alert includes an indication that the first malware was detected on the first computing device; and receiving a second alert from the second computing device, wherein the second alert includes an indication that the second malware was detected on the second computing device.

13. The method of claim 10, further comprising:

determining information corresponding to the same shared data storage, wherein the same shared data storage is assigned to a storage account;

identifying an owner of the storage account from the determined information; and outputting the notification to the identified owner of the storage account.

14. The method of claim 10, further comprising:

identifying information pertaining to communications between the same shared data storage and the first and second computing devices;

determining whether the first malware or the second malware originated from the first computing device, the second computing device, or the same shared data storage based on the identified information; and outputting an indication as to whether the first malware or the second malware likely originated from the first computing device, the second computing device, or the same shared data storage.

15. The method of claim 10, further comprising:

identifying cloud-based details corresponding to activities of related to the first computing device being infected with the first malware and the second computing device being infected with the second malware; and outputting the identified cloud-based details, to determine where the first malware and the second malware likely originated.

16. The method of claim 10, further comprising:

identifying cloud-based details corresponding to multiple tenants having accounts to the same shared data storage, wherein the multiple tenants are members of multiple organizations;

determining where the first malware and the second malware originated from the identified cloud-based details; and outputting an indication as to where the first malware and the second malware originated.

17. A non-transitory computer-readable medium on which is stored computer-readable instructions that when executed by a processor, cause the processor to:

determine that a first malware was detected on a first computing device;

determine whether a second malware was detected on a second computing device within a predefined period of time after the first malware was detected on the first computing device, wherein the first computing device and the second computing device accessed a same shared data storage; and based on a determination that the second malware was detected on the second computing device within the predefined period of time after the first malware was detected on the first computing device and a determination that the first computing device and the second computing device accessed the same shared data storage, output a notification that the same shared data storage is to be checked to determine whether the same shared data storage spread the first malware and the second malware.

18. The non-transitory computer-readable medium of claim 17, wherein the instructions further cause the processor to:

identify additional computing devices that have accessed the same shared data storage; and implement a remedial measure to prevent the additional computing devices from being infected with the first malware and the second malware.

19. The non-transitory computer-readable medium of claim 17, wherein the instructions further cause the processor to:

identify information pertaining to communications between the same shared data storage and the first and second computing devices;

determine whether the first malware or the second malware originated from the first computing device, the second computing device, or the same shared data storage based on the identified information; and output an indication as to whether the first malware or the second malware originated from the first computing device, the second computing device, or the same shared data storage.

20. The non-transitory computer-readable medium of claim 17, wherein the instructions further cause the processor to:

identify cloud-based details corresponding to activities related to the first computing device being infected with the first malware and the second computing device being infected with the second malware; and output the identified cloud-based details, to determine where the first malware and the second malware originated.

* * * * *